Dec. 25, 1951     S. R. FUNSTEN ET AL     2,579,732
COATED SEED
Filed Sept. 20, 1946

STANARD R. FUNSTEN,
FREDERICK W. BURGESSER,
INVENTORS.

BY
Gerald H. Peterson
ATTORNEYS.

Patented Dec. 25, 1951

2,579,732

UNITED STATES PATENT OFFICE 2,579,732

COATED SEED

Stanard R. Funsten, Pasadena, and Frederick W. Burgesser, Compton, Calif., assignors to Filtrol Corporation, Los Angeles, Calif., a corporation of Delaware Application September 20, 1946, Serial No. 698,384

9 Claims. (Cl. 47—1)

This invention relates to a coated seed and to the method of coating said seeds.

An object of our invention is to produce coated seeds of substantially uniform size, shape and character and rendering the seeds easy to handle. In commercial planting of certain types of seeds, planting machines are used. In such cases it is very desirable for satisfactory operation of such machines that all seeds be sufficiently large for convenient handling and substantially uniform in size and shape. A further object of our invention is to provide satisfactory seeds by coating so that they may be readily handled by planting machines.

The material used in coating such seeds must meet a number of requirements. It must be a material which will easily form a coating and upon drying be sufficiently hard to withstand handling and use in a planting machine without cracking or chipping off. The material should also be capable of forming a coating about the seed without the addition of a binding agent or excessive quantities of water. In a large class of seeds, such as beans and peas, that are characterized by having a thin skin, excessive quantities of water in the coating material present two difficulties. During the coating operation the seed has a tendency to absorb water thereby causing it to swell, and upon drying again decreases in size and allows the coating material to fall away and not adhere to the seed. The danger also exists that if excessive quantities of water are used, the seed may start to germinate prematurely during drying. The material must also be of such a nature that it will readily absorb water or moisture from the soil after planting so as to permit germination growth.

It is a further object of our invention to use a material that will readily form a coating without the addition of any binding material or excessive water which when dried will be sufficiently hard to withstand a certain amount of rough handling and which will not prevent or retard germination and which, when subjected to the moisture of the earth after planting, will become sufficiently soft to readily permit free emergence and growth of the germinated seed.

Frequently a large percentage of seeds which germinate fail to continue growing because of some fungus or disease in the soil with which the seeds or the soil is infected which will kill a young plant but will be harmless when the plant has reached a more mature stage. It is a further object of our invention to provide a protective coating around the seed which may be impregnated with a fungicidal material which will prevent or prohibit the attack of some of the soil diseases, thereby assuring a greater plant yield from a given quantity of seed.

Some seeds and young plants are attacked by soil insects and worms. It is a further object of our invention to provide a protective coating around the seed which may be impregnated with an insecticide or insect repellant material.

Other and further objects and advantages will become apparent from the drawings and specifications relating thereto.

The use of various materials in an attempt to form a satisfactory coated seed is old in the art. However, to the best of our knowledge, none of the prior art teaches the use of sub-bentonite clay. We have found that by using raw sub-bentonite clay, i. e., the native sub-bentonite clay as distinguished from the acid activated clay, coated seeds may be produced which meet substantially all of the requirements.

Sub-bentonites are a class of montmorillonite clays, the base-exchange capacity of which is satisfied largely by Ca and Mg ions. They may be termed alkaline earth bentonites. They are of the class of bentonites which are activatable by acid treatment to produce active adsorbents and petroleum cracking catalysts. They are substantially non-swelling when compared with ordinary swelling bentonites, the base-exchange ions of which are largely alkali ions, particularly sodium ions.

The use of a finely ground sub-bentonite clay led to certain unobvious results. The first question presented in the process of coating the seed was: Would the material proposed readily form a coating and adhere to the seed? This could not be predicted without extensive experimentation. It was found that the sub-bentonite clay upon proper handling very readily adhered to the seed and formed a satisfactory uniform pellet. The second question presented was: After forming the coating would it be strong enough to withstand the comparatively rough handling in a mechanical planter? It was found that pellets formed of sub-bentonite clay would, when dry, form a pellet sufficiently hard to satisfactorily withstand the handling of a mechanical planter. The third question presented was: After the coating had been formed, would the material remain hard enough or repel water sufficiently to retard or prevent germination? It was found that the sub-bentonite clay readily allowed moisture to get to the seed to promote germination and is readily softened by small amounts of moisture, thereby encouraging and aiding germination and growth. Thus the discovery has been made that a sub-bentonite clay readily adheres to the seed and forms a coating, which after drying, is sufficiently hard to withstand rough handling of a mechanical planter, all without the addition of any binder material, and further permits and encourages free germination and growth of the seeds after planting.

Figure 1:
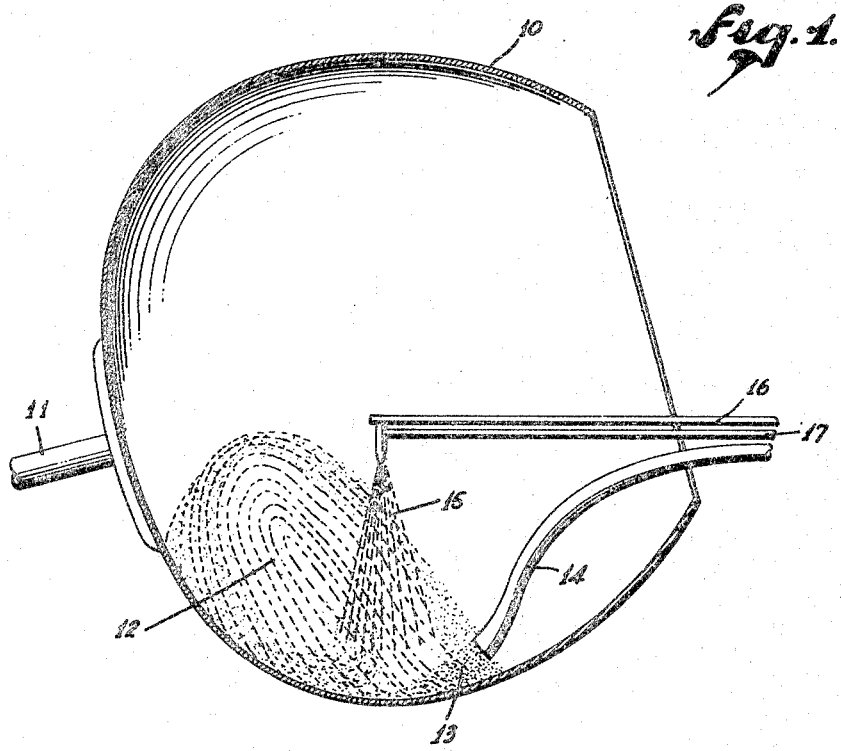
Figure 1 shows a sectional view of an apparatus used in practicing my invention.
Figure 2:
Figure 2 is a cross section of a coated beet seed.
Figure 3:
Figure 3 is a sectional view of a coated lettuce seed.

Referring to Figure 1, we have illustrated a method of coating seed wherein we use an engrossing pan 10 similar to a candy engrossing pan rotating about an axis concentric with shaft 11 and driven by any suitable means of power (not shown). The seeds 12 of any desired type are placed in the engrossing pan 10, which is rotated. The sub-bentonite clay 13 ground to satisfactory fineness is slowly added through sprout 14 while water is being added by means of an atomized water spray 15 from water pipe 16 and compressed air pipe 17. The rotation of the pan 10 thoroughly mixed the seed 12 and the ground clay 13, the seeds picking up a coating of clay as they roll. Very little control of temperature of the water is necessary. Satisfactory results were obtained with any water temperature. It is apparent, however, that the temperature must not exceed the sterilizing temperature of the seed.

The VM (volatile matter) of the material used for coating has a bearing on the success of the product and method of application. VM is the loss on heating at 1700° F. to a constant weight expressed as a percentage of material before heating. Preferred VM is 15-25%. It is possible to use a clay having less than 15%, but should not go below 5% because lattice water or water of crystallization is then removed. A VM in excess of 25% renders the clay too sticky for practical use.

In general it is preferred to use a mesh size of clay between 40 and 100 mesh, but variations therefrom may also be used. It is preferred to use a mesh size of clay somewhat smaller than the seeds to be coated. The thickness of the coating to be applied is a function of mesh size and time of operation; being a direct function of mesh size and time and desired thickness is determined by the use to which the seed is to be put, i. e., the type and requirements of the mechanism for planting.

It will readily become apparent that the smoothness and regularity of the outer surface of the coated seed is also a direct function of the thickness of the coating. Regardless of the size and shape of the seed to be coated, a perfectly round pellet can be formed by adding sufficient clay. Moreover, the coated seed will be substantially uniform in size. This is highly advantageous for use in a mechanical planter.

In the interest of speeding up the process of depositing the coat on the seed, various amounts of sandy alluvium capable of passing through a twenty mesh screen was mixed with the clay. The alluvium was composed of a finely divided sand and silt having substantially no clay. Other materials, such as diatomaceous earth may also be used. The resulting coating from these mixtures gave varying degrees of hardness.

A mixture of 50% such sandy alluvium and 50% clay produced a coated seed that will withstand the ordeal of going through the planter with substantially little breakage. The pellets with 35% sandy alluvium showed no more breakage than 100% clay pellets. The softening and germinating qualities of these pellets with a maximum mixture of about 60% sandy alluvium are equal to the 100% clay.

The manner in which water is added is important both from the standpoint of forming the coating and from the standpoint of the type of seed used. Some seed, such as beets, may be treated by soaking for as long as ten minutes prior to rolling in the pan because of the corticated nature of the seed covering. Such a seed does not absorb much water or germinate readily. Other seed, such as beans and peas, are more difficult to handle because they have a thin skin that readily absorbs moisture, causing the seed to swell and begin the process of germination. The method or process of adding water may be controlled by controlling the amount and fineness of the water spray 15 so that just sufficient water is added to cause the finely ground clay 13 to adhere to the seeds. We have found that if the water spray 15 is added with the droplets being too large or too great a quantity, the clay tends to stick to the sides of the pan 10 and will form clay balls with no seed in the center. The formation of clay balls will occur to a certain degree even though the water spray 15 is correctly applied so that it becomes necessary to screen the partially coated seed prior to the time that any of the unwanted clay balls are formed as large as the partially coated seed. Substantially all of the unwanted clay balls can be removed by this method.

After the seed has been coated and properly screened, the resulting product must be dried. In drying the coated seed, care must be exercised in not attempting to dry the seed too fast. It is apparent that a greater speed in drying may be obtained by placing the product in an atmosphere of higher temperature. However, it is advisable not to allow the temperature to exceed the sterilization temperature of the seed. The final product should be dried to below about 15% moisture content of the coating. If more than 18% moisture content is allowed to remain there is a danger that the seed may start to germinate prematurely.

It is evident that after the seed has been coated it is impossible to tell the nature of the seed on the inside. We prefer in the last stages of coating the seed to add various small amounts of inert dyes, thereby lending a color identification system to the coated seed. For example, lampblack, chrome green, or other pigments may be used.

All sub-bentonite clays used have been found satisfactory. It was noted, however, that sub-bentonite clays mined at different places presented varying degrees of satisfaction. Clays mined at Cheto, Husband and Itawamba were tested. The analyses of these clays on the volatile free basis, that is, after heating to 1700° F. without further loss, are as follows:

|  | Cheto | Husband | Itawamba |
|---|---|---|---|
|  | Per cent | Per cent | Per cent |
| $SiO_2$ | 69.0 | 65.1 | 59.6 |
| $Al_2O_3$ | 20.3 | 22.4 | 21.4 |
| $Fe_2O_3$ | 1.8 | 6.5 | 6.7 |
| MgO | 6.9 | 4.9 | 3.0 |
| CaO | 2.6 | 2.0 | 1.5 |
| Base Exchange Capacity | 133 | 123 | 89 |

When the term "base exchange capacity" is used in this application it is to be understood as expressed in milli-equivalents per hundred grams of volatile free clay as determined by the test described by Bower and Truog in the Analytical Edition of Industrial and Engineering Chemistry, vol. 12, No. 7, page 411, July 15, 1940, in which the clay sample is exchanged with manganous ions and the latter released and measured colorimetrically.

The thermal dehydration curves of these three sub-bentonite clays show the usual endothermic peaks for sub-bentonites at about 300–350° F., about 1200–1250° F. and about 1600° F. corresponding to the removal of absorbed and adsorbed water; removal of lattice water or water of crystallization; and disintegration of the montmorillonite crystal structure respectively. Of the three sub-bentonites used it was found that a statisfactory coating could be obtained by the use of any one of the three. However, the most satisfactory coating was found by the use of the Cheto type sub-bentonite. It was found that this type of sub-bentonite clay more readily forms an adherent coating of the desired hardness and slakability.

Accordingly, it has been found that a sub-bentonite clay having an MgO content greater than about 4% and a base exchange capacity of greater than 95 gave satisfactory results as a seed coating. Moreover, for the best results it has been found that the MgO content should be above about 5.5%, the base exchange capacity should be above about 110 and that the thermal dehydration curve should show substantially no endothermic peak due to an endothermic reaction in the region of 950 to 1000° F.

We have discussed and described our invention as applying to any type of seed generally. One of the more important applications lies in its use in connection with sugar beet seed. Mechanical planting of sugar beet seed has been difficult because such seed grow in clusters, which if planted result in crowding of the plants and expensive hand labor to thin. Heretofore this problem has been partially solved by segmenting the seed or by decorticating. An advantage of our invention lies in the fact that a single sugar beet seed may be provided with a suitable coating to permit individual seed to be planted at spaced intervals, thus assuring a more even stand at less labor cost.

While we have herein shown and described our invention in what we have conceived to be the most practical and preferred embodiment, it is recognized that departures may be made therefrom within the scope of our invention, which is not to be limited to the details disclosed herein, but is to be accorded the full scope of the claims so as to embrace any and all equivalent products and processes.

Having described our invention, what we claim as new and desire to secure by Letters Patent is:

1. A seed pellet consisting of a plant seed embedded in a hard, dry, smooth, outer coating of a naturally adhesive composition, said coating comprising finely divided native sub-bentonite clay compacted as a unit about the seed by the inherent adhesivity of the finely divided sub-bentonite clay, said pellet having a thickness at least several times greater than the original plant seed and said coating being readily disintegrated upon contact with moisture.

2. A seed pellet consisting of a plant seed embedded in a hard, dry, smooth, outer coating of a naturally adhesive composition, said coating comprising finely divided native sub-bentonite clay compacted as a unit about the seed by the inherent adhesivity of the finely divided sub-bentonite clay, said finely-divided sub-bentonite clay being produced from a sub-bentonite clay mass having a MgO content greater than 4 per cent and a base exchange capacity greater than 95, said pellet having a thickness at least several times greater than the original plant seed and said coating being readily disintegrated upon contact with moisture.

3. A seed pellet consisting of a plant seed embedded in a hard, dry, smooth, outer coating of a naturally adhesive composition, said coating comprising finely divided native sub-bentonite clay compacted as a unit about the seed by the inherent adhesivity of the finely divided sub-bentonite clay, said finely divided sub-bentonite clay being produced from a sub-bentonite clay mass having a MgO content greater than about 5.5 per cent and a base exchange capacity greater than about 110, and a thermal dehydration curve showing substantially no endothermic reaction in the region of between 950° F. and 1000° F., said pellet having a thickness at least several times greater than the original plant seed and said coating being readily disintegrated upon contact with moisture.

4. A seed pellet consisting of a plant seed embedded in a hard, dry, smooth, outer coating of a naturally adhesive composition, said coating comprising a mixture of finely divided native sub-bentonite clay and finely divided inert material compacted as a unit about the seed by the inherent adhesivity of the finely-divided sub-bentonite clay, said pellet having a thickness at least several times greater than the original plant seed and said coating being readily disintegrated upon contact with moisture.

5. A seed pellet consisting of a plant seed embedded in a hard, dry, smooth, outer coating of a naturally adhesive composition, said coating comprising a mixture of not less than 50 per cent of finely divided sub-bentonite clay and not more than 50 per cent of finely divided inert material compacted as a unit about the seed by the inherent adhesivity of the finely divided sub-bentonite clay, said pellet having a thickness at least several times greater than the original plant seed and said coating being readily disintegrated upon contact with moisture.

6. A seed pellet consisting of a plant seed embedded in a hard, dry, smooth, outer coating of a naturally adhesive composition, said coating comprising a mixture of not less than 50 per cent of finely divided sub-bentonite clay and not more than 50 per cent of sandy alluvium compacted as a unit about the seed by the inherent adhesivity of the finely divided sub-bentonite clay, said pellet having a thickness at least several times greater than the original plant seed and said coating being readily disintegrated upon contact with moisture.

7. A seed pellet consisting of a plant seed embedded in a hard, dry, smooth, outer coating of a naturally adhesive composition, said coating comprising a mixture of not less than 50 per cent of finely divided sub-bentonite clay and not more than 50 per cent of a finely divided diatomaceous earth compacted as a unit about the seed by the inherent adhesivity of the finely divided sub-bentonite clay, said pellet having a thickness at least several times greater than the original plant seed and said coating being readily disintegrated upon contact with moisture.

8. A seed pellet consisting of a plant seed embedded in a hard, dry, smooth, outer coating of a naturally adhesive composition, said coating comprising a mixture of not less than 50 per cent of finely divided native sub-bentonite clay and not more than 50 per cent of a finely divided inert material of the class consisting of sandy alluvium and diatomaceous earth compacted as a unit about the seed by the inherent adhesivity of the finely divided sub-bentonite clay, said finely divided sub-bentonite clay being produced from a sub-bentonite clay mass having a MgO content greater than 4 per cent and a base exchange capacity greater than 95, said pellet having a thickness at least several times greater than the original plant seed and said coating being readily disintegrated upon contact with moisture.

9. A seed pellet consisting of a plant seed embedded in a hard, dry, smooth, outer coating of a naturally adhesive composition, said coating comprising a mixture of not less than 50 per cent of finely divided native sub-bentonite clay and not more than 50 per cent of a finely divided inert material of the class consisting of sandy alluvium and diatomaceous earth compacted as a unit about the seed by the inherent adhesivity of the finely divided clay, said finely divided sub-bentonite clay being produced from a sub-bentonite clay mass having a MgO content greater than about 5.5 per cent and a base exchange capacity greater than about 110, and a thermal dehydration curve showing substantially no endothermic peak due to an endothermic reaction in the region between 950° F. and 1000° F., said coating being readily disintegrated upon contact with moisture.

STANARD R. FUNSTEN.
FREDERICK W. BURGESSER.

REFERENCES CITED

The following references are of record in the file of this patent:

UNITED STATES PATENTS

| Number | Name | Date |
|---|---|---|
| 312,041 | Upjohn | Feb. 10, 1885 |
| 1,319,157 | Lingle | Oct. 21, 1919 |
| 1,819,953 | Funk | Aug. 18, 1931 |
| 2,314,091 | Jones | Mar. 16, 1943 |
| 2,392,518 | Barnhill | Jan. 8, 1946 |